(12) United States Patent
Xu et al.

(10) Patent No.: US 10,828,616 B2
(45) Date of Patent: Nov. 10, 2020

(54) METHODS AND APPARATUS FOR FLUID CONTACTING IN A DOWNFLOW VESSEL

(71) Applicant: UOP LLC, Des Plaines, IL (US)

(72) Inventors: Zhanping Xu, Inverness, IL (US); Christopher Naunheimer, Arlington Heights, IL (US); Pengfei Chen, Glenview, IL (US); Steven J. Lesniak, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 304 days.

(21) Appl. No.: 16/035,454

(22) Filed: Jul. 13, 2018

(65) Prior Publication Data

US 2019/0105629 A1 Apr. 11, 2019

Related U.S. Application Data

(60) Provisional application No. 62/538,289, filed on Jul. 28, 2017.

(51) Int. Cl.
*B01J 19/00* (2006.01)
*B01J 8/04* (2006.01)
*B01J 8/02* (2006.01)

(52) U.S. Cl.
CPC ........... *B01J 19/006* (2013.01); *B01J 8/0278* (2013.01); *B01J 8/0453* (2013.01); *B01J 8/0492* (2013.01); *B01J 2208/00849* (2013.01); *B01J 2208/00938* (2013.01); *B01J 2219/00763* (2013.01)

(58) Field of Classification Search
CPC ............... B01J 18/0278; B01J 18/0453; B01J 18/0492; B01J 19/006; B01J 2208/00849; B01J 2208/00938; B01J 2219/00763

USPC ..................................... 261/96, 97, 109, 110
See application file for complete search history.

(56) References Cited

U.S. PATENT DOCUMENTS

| | | | | |
|---|---|---|---|---|
| 4,836,989 A * | 6/1989 | Aly | ........................ | B01J 8/0453 422/605 |
| 4,960,571 A | 10/1990 | Bhagat et al. | | |
| 5,232,283 A * | 8/1993 | Goebel | ............... | B01F 3/04496 261/113 |
| 5,554,346 A | 9/1996 | Perry et al. | | |
| 5,567,396 A | 10/1996 | Perry et al. | | |
| 6,984,365 B2 * | 1/2006 | Nelson | ..................... | B01D 3/20 422/224 |
| 7,506,861 B2 * | 3/2009 | Muller | ..................... | B01D 3/20 261/114.1 |
| 8,017,095 B2 * | 9/2011 | Kemoun | ................ | B01J 8/0453 422/606 |
| 8,337,787 B2 * | 12/2012 | Augier | ................... | B01J 8/0453 422/220 |
| 9,186,600 B2 * | 11/2015 | Alzner | ................... | B01D 3/324 |

(Continued)

OTHER PUBLICATIONS

Written Opinion from corresponding PCT Application No. PCT/US2018/043436, dated Oct. 10, 2018.

(Continued)

*Primary Examiner* — Charles S Bushey

(57) ABSTRACT

A contacting device and method are presented for the collection, contacting, and distribution of fluids between particulate beds of a downflow vessel, which may operate in co-current flow. By one approach, the contacting device includes a liquid collection tray, a mixing channel in fluid communication with the liquid collection tray, and a liquid distribution zone.

20 Claims, 7 Drawing Sheets

(56) References Cited

U.S. PATENT DOCUMENTS

| | | | | |
|---|---|---|---|---|
| 9,321,023 B2* | 4/2016 | Xu | ..................... | B01J 8/0492 |
| 9,403,139 B2* | 8/2016 | Muller | .................. | C10G 45/04 |
| 10,336,952 B2* | 7/2019 | Song | ..................... | C10G 45/32 |
| 10,376,856 B2* | 8/2019 | Xu | ..................... | B01F 3/04078 |
| 10,486,127 B2* | 11/2019 | Xu | ..................... | B01J 8/0235 |
| 10,518,235 B2* | 12/2019 | Xu | ..................... | B01J 8/0492 |

OTHER PUBLICATIONS

International Preliminary Report on Patentability from corresponding PCT Application No. PCT/US2018/043436, dated Jan. 28, 2020.
International Search report for corresponding PCT application No. PCT/US2018/043436, dated Oct. 25, 2018.

* cited by examiner

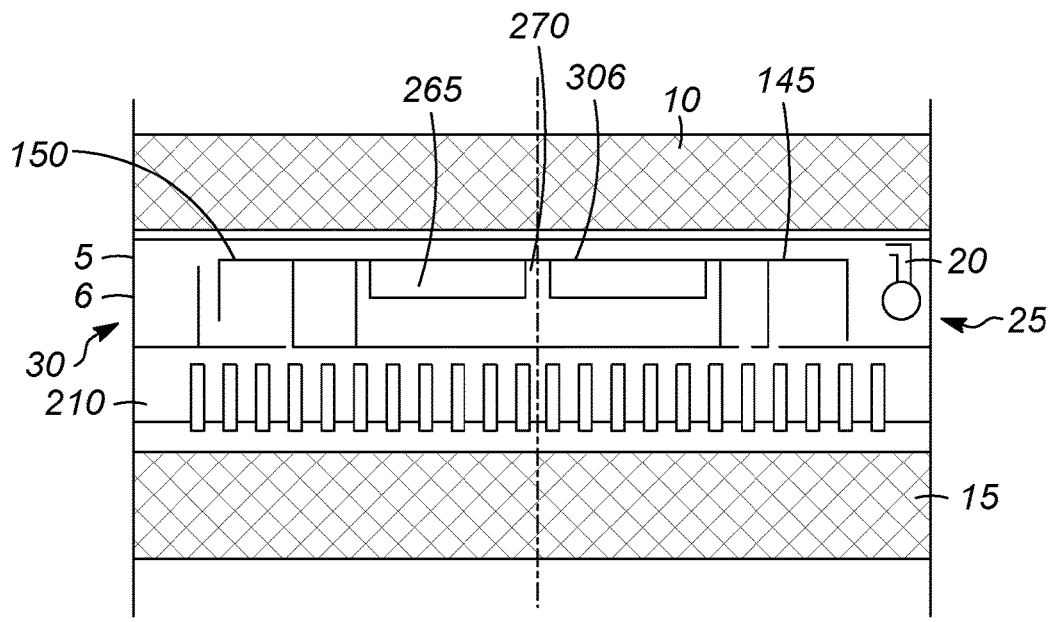
FIG. 1
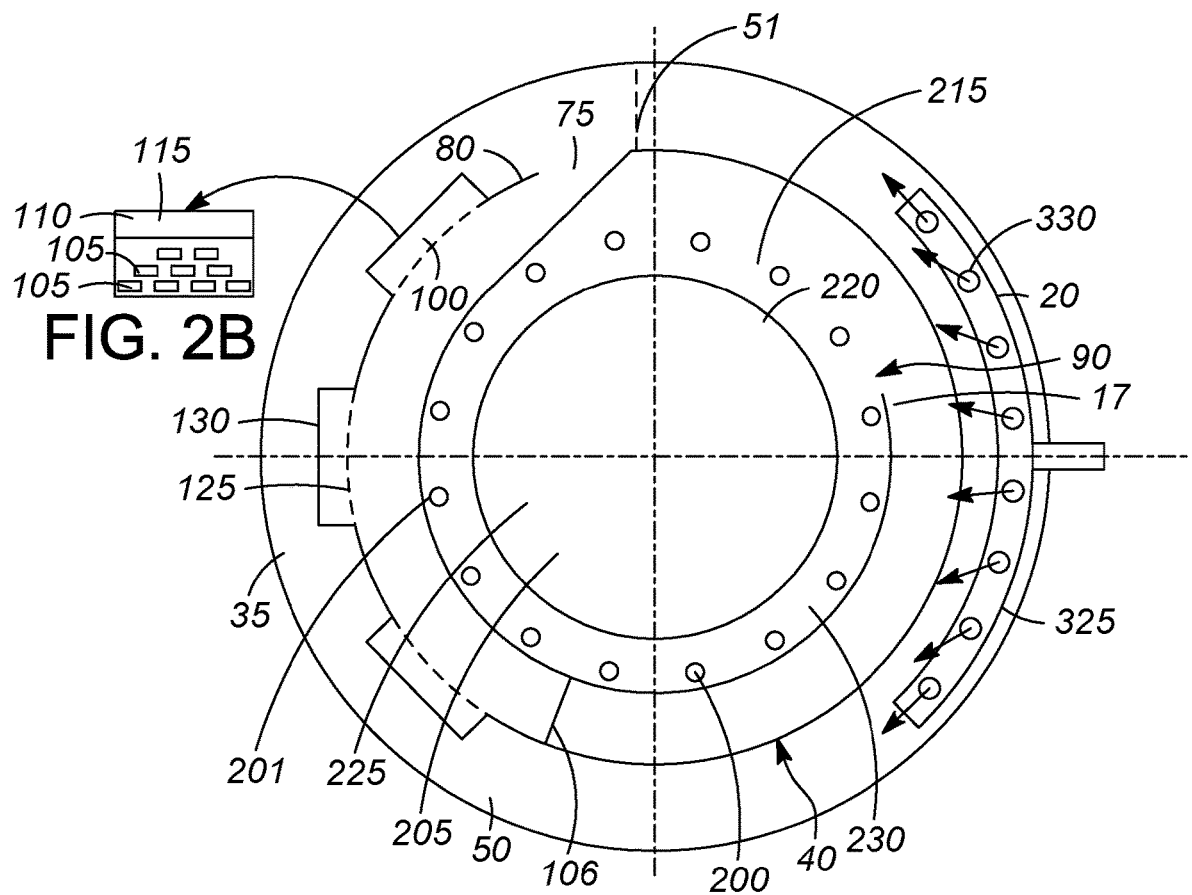
FIG. 2B
FIG. 2A

__METHODS AND APPARATUS FOR FLUID CONTACTING IN A DOWNFLOW VESSEL__

CROSS-REFERENCE TO RELATED APPLICATION

This application claims priority from Provisional Application No. 62/538,289 filed Jul. 28, 2017, the contents of which cited application are hereby incorporated by reference in its entirety.

FIELD OF THE INVENTION

This invention relates to methods and apparatus for contacting fluids in a co-current flow vessel. More particularly, the invention relates to methods and apparatus for contacting liquid and vapor between two beds in a downflow vessel.

BACKGROUND OF THE INVENTION

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, gas treatment, and adsorption for separation.

Co-current reactors with fixed beds are constructed such that the reactor allows for the fluid to flow over the catalyst bed. When the fluid is a liquid, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

Due to constraints in the height of the space between reactor beds, there is a limited amount of space for introducing a quench fluid and mixing the vapor and liquid along with the quench fluid. Particularly, for existing hydroprocessing reactors, the space between catalyst beds is already set, and sometimes it is difficult to install new internals for improving mixing of fluids within the existing interbed space without reducing the height of catalyst beds. Even for new reactors, it is often desired to reduce the overall size of the reactors to reduce capital expenditure and the profile of the reactor in a processing plant. Therefore, it is desirable to provide for good mixing of fluids between adjacent catalyst beds in a relatively short interbed space.

Previous attempts to overcome these limitations have included vortex or turbulent type mixers which generally include providing flow of the fluids together in a manner to affect mixing. An example of a vortex type mixer is described in U.S. Pat. No. 8,017,095. The cylindrical mixing device __40__ is positioned on a collecting tray and includes inlets __50__ and __55__ and a single outlet __80__ in the bottom center of the bottom wall. The fluid and liquid enter the device together through inlets __50__ and __55__. These devices are limited in that mixing is affected by the turbulent or swirling flow of fluids together within the device in the same general direction and with vapor atop of liquid.

The design of reactor internals to overcome these limitations can save significantly on the valuable space within a reactor. New reactor internals that improve the utilization of the space within a reactor shell can maximize catalyst loading, and obviate the need for new reactor shell components, as well as prevent the down time for replacing an entire reactor.

BRIEF DESCRIPTION OF THE DRAWINGS

FIG. __1__ is a cross-sectional side view of a mixing device situated within a multi-bed catalytic reactor in accordance with various embodiments;

FIG. __2A__ is a cross-sectional top view of a mixing device in accordance with various embodiments;

Figure 3:
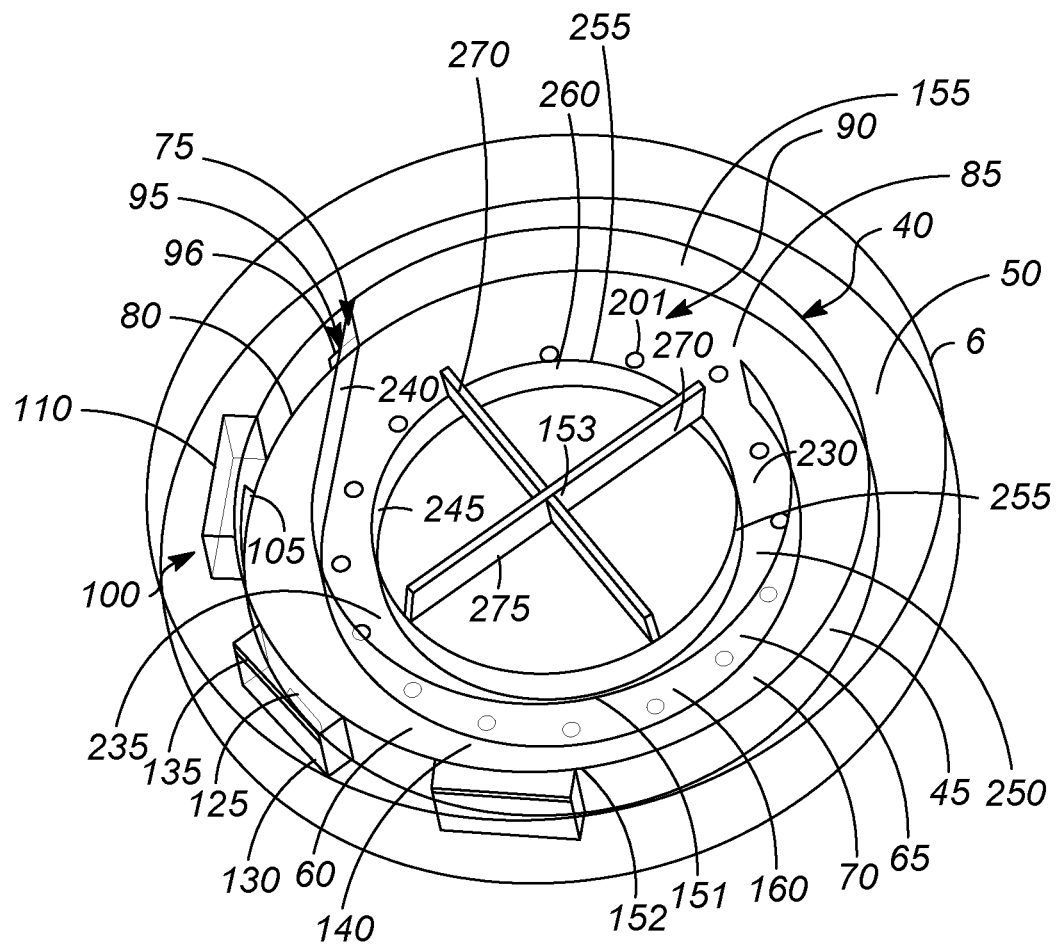

FIG. __2B__ is a side view of a vapor chimney of the mixing device of FIG. __2A__ in accordance with various embodiments;

FIG. __3__ is a partial perspective view of a mixing device in accordance with various embodiments;

FIG. __4__ is a partial perspective view of an alternative mixing device in accordance with various embodiments;

FIG. __5__ is a cross-sectional side view of an alternative mixing device situated within a multi-bed catalytic reactor in accordance with various embodiments;

FIG. __6__ is a cross-sectional top view of an alternative mixing device in accordance with various embodiments;

FIG. __7__ is a partial perspective view of an alternative mixing device in accordance with various embodiments;

FIG. __8__ is a cross-sectional side view of an alternative mixing device situated within a multi-bed catalytic reactor hand having a distributor bottom tray offset below the mixing device in accordance with various embodiments;

FIG. __9__ is a cross-sectional side view of a mixing device illustrating a top plate in accordance with various embodiments;

FIG. __10__ is a cross-sectional top view of a mixing device illustrating a top plate in accordance with various embodiments; and FIG. __11__ is a side view of a weir of a top plate in accordance with various embodiments.

DETAILED DESCRIPTION OF THE INVENTION

According to various aspects, the mixing device and system, and method for using the same, disclosed herein are disposed in the space between beds in a co-current flow vessel. For ease of explanation the following will be described in terms of a downflow reactor including two or more spaced catalyst beds, but the mixing devices and system, and methods described herein may also be used in and applied to other hydrocarbon processing vessels having different types of processing beds, including, but not limited to adsorbent beds in an adsorbent separation chamber. The catalyst beds in a reactor are separated by space for quench, mixing and distribution of the fluids, where the mixing zones are designed to cool/heat, mix, and sometimes condense effluent fluids from a catalyst bed above. In one example, as illustrated in FIG. 1, the mixing device and system may be included in a hydroprocessing downflow reactor 5 and fluid flows from superior catalyst bed 10 to an inferior catalyst bed 15. The fluid may include vapor, liquid, or a mixture of vapor and liquid. The reactor fluid may be quenched with a quench gas or liquid (collectively referred to as "quench fluid" herein) from a quench fluid distributor 20, and the fluid is mixed and then distributed to the inferior catalyst bed 15 in quench zone 25. It should be noted that the term "fluid" as used herein refers to either or both of liquid and vapor. The fluid is mixed to minimize temperature and composition differences before being distributed to the inferior catalyst bed 15 below the quench zone. In current systems, there is considerable space between the reactor beds for quench and mixing. A reduction in the amount of space needed for these functions can advantageously provide for maximum catalyst loading within the reactor 5 to improve processing and performance without replacing an entire reactor. Similarly, new reactors may be designed with smaller profiles and at smaller capital expense if the height of quench zones is minimized.

Good distribution of liquids over catalyst beds is important to avoid adverse effects, such as uneven temperature rise and hot spots within the catalyst bed. Hot spots occurring in the catalyst beds can lead to a shortened catalyst life or to poor product quality. The methods and devices described herein are designed to reduce the height of quench zone without sacrificing fluid mixing and distribution performance.

By one aspect, a system 30 is provided for vapor-liquid contacting in a quench zone between catalyst beds in co-current flow reactor 5. In one example, the reactor 5 may be a generally cylindrically shaped downflow reactor. The system 30 includes a liquid collection tray 35 that may be supported by a support structure within the reactor 5, for example, a support ring or other structures not shown. The liquid collection tray 35 preferably extends substantially across the area of the reactor 5 to restrict fluids from by-passing the mixing zone 30, and openings are typically provided through the liquid collection tray 35 to allow distribution of fluids to the inferior catalyst bed 15. At least a portion of the liquid collection tray 35 collects fluids traveling downwardly from the superior catalyst bed 10 thereon.

Figure 4:
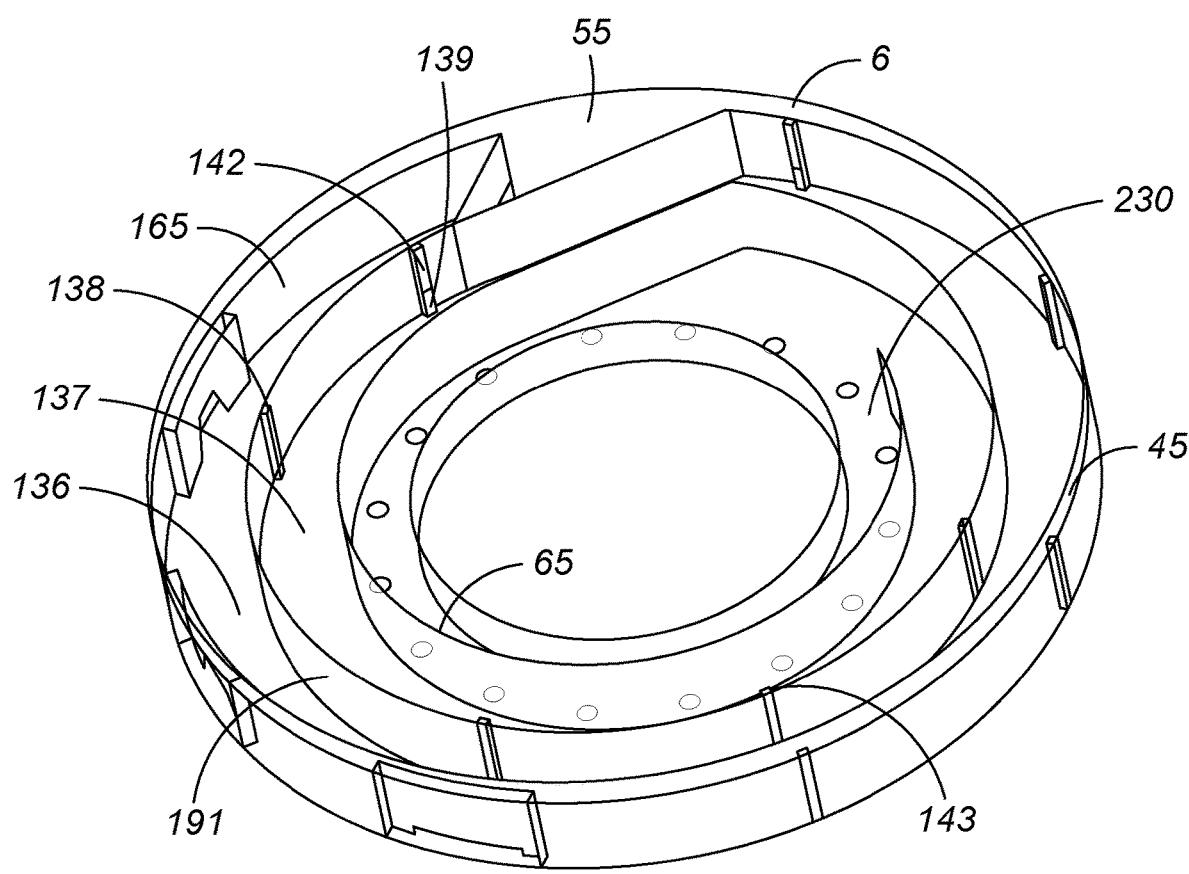

Referring to FIGS. 1-3, a mixing device 40 is provided for mixing liquid and vapor within the quench zone 25. The mixing device is preferably supported by the liquid collection tray and is positioned thereabove, although the mixing device 40 may be positioned below the liquid collection tray, or have portions thereof above or below the liquid collection tray 35. By one aspect, the mixing device 40 is supported on the liquid collection tray 35 and includes an outer wall 45 separating the mixing device 40 from a liquid collection zone 50. The outer wall 45 may be generally circular as illustrated or may be polygonal or another suitable shape. The liquid collection zone 50 may include a gap between the outer wall 45 and the reactor wall 5 extending entirely or at least a portion about the outer wall 45. During operation, liquid from the superior catalyst bed 10 is collected in the liquid collection zone 50. In one example, in order for the liquid collecting zone to provide sufficient space for existing reactor shell attachments, installation of the mixing device and for accommodating the quench distributor 20 the outer wall 45 is positioned between about 5 and about 20 in. from the reactor wall. In another example it is between about 10 and about 15 in. from the reactor wall. By one approach, a baffle 51 extends across the liquid collection zone to facilitate flow in a single direction about the mixing device outer wall 45 to improve pre-mixing of the liquid. As illustrated in FIG. 4, to provide additional mixing area within the mixing device 40, by one aspect the outer wall 45 may be positioned in close proximity or adjacent to the reactor wall 5. In one approach, the outer wall 45 is positioned between about 0 and about 5 in. from the reactor wall. To provide sufficient area for liquid collection, in this approach, a liquid collection well 55 may be provided in a gap in the outer wall 45.

The mixing device 40 includes a mixing channel 60 for mixing vapor and liquid. The mixing channel 60 may include one or more elongate channels to facilitate the flow of liquid and vapor therethrough. Since vapor flows through the mixing channel 60, at least a portion of the mixing channel 60 is substantially enclosed to maintain vapor within the mixing channel 60 during mixing. As illustrated in FIG. 2A, the mixing channel 60 is an elongate generally annular channel extending about the center axis of the reactor 5 and/or the mixing device 40. The annular mixing channel 60 may be round as illustrated, polygonal or other shapes. By one aspect the mixing channel 60 is formed between the outer wall 45 and an inner wall 65. The outer wall 45 and inner wall 65 may be formed by baffles extending upwardly from the mixing channel bottom wall 70, which may be a portion of the liquid collection tray. The outer wall 45 and inner wall 65 may include two or more separate baffles as illustrated in FIG. 2A or a single baffle extending in an inwardly swirling pattern.

By one aspect, the mixing channel 60 includes a liquid inlet 75 at an inlet end portion 80 thereof and an outlet 85 at an outlet end portion 90 thereof. In one approach the liquid inlet 75 includes an opening 95 in the side of the outer wall 45 or other wall of the mixing channel 60 at the inlet end portion 80. It should be noted that as used herein, the term "opening" refers to any type of opening or other structure capable of providing the passage of fluid therethrough, including, but not limited to apertures, nozzles, perforations, slots, tubes, and spouts. The liquid inlet opening 95 may be positioned at a lower portion of the mixing channel 60. In this regard, liquid collected on the liquid collection tray 35 can enter through the opening 95, however, the low position of the opening 95 allows liquid to flow through preferentially than vapor. To this end, the liquid inlet opening 95 may be formed with a top portion 96 near or beneath an expected operating liquid level above the liquid collection tray 35 at full vapor and liquid design loading. In one example the opening is positioned at a bottom 70% of the height of the mixing channel 60. In another example, the opening is positioned at a bottom 50% of the height of the mixing channel 60 and at a bottom 30% of the height of the mixing channel 60 in another example. In one example, at least about 80% of an open area of the liquid inlet opening 95 is in a bottom 50% of the height of the mixing channel 60 and in about a bottom 30% of the height of the mixing channel in another example. In this manner, fluid flowing through the liquid inlet is comprised substantially of liquid. In one approach, at least about 40% of opening is for liquid flow. In another example, at least about 80% of the opening is for liquid flow.

Liquid entering the liquid inlet 95 travels through the mixing channel 60 and in a generally downstream direction toward the outlet 85. By one aspect, the mixing device includes one or more vapor inlets for passing vapor from an upper catalyst bed and outside of reactor into the mixing channel 60. In one approach, a vapor inlet 100 is positioned along the mixing channel 60 downstream of the liquid inlet 75 for improving contacting of the vapor with the liquid which passes through the mixing channel 60. A vapor inlet opening 105 may be provided in the outer wall 45 of the mixing channel, and may be positioned at a bottom portion of the mixing channel 60 to improve vapor-liquid contacting as the vapor enters through the vapor inlet opening 105 even when the level of the liquid flowing through the mixing channel 60 is relatively low. In one approach, a mixing channel weir 106 may extend across a portion of the mixing channel 60. The weir 106 maintains a minimum amount of liquid in the mixing channel so that vapor will contact liquid even when only a small amount of liquid flows through the mixing channel 60, for example during startup or shutdown. The weir can be positioned in various angles relative to the mixing channel for improving liquid mixing. In one example the opening 105 is positioned at a bottom 70% of the height of the mixing channel 60. In another example, the vapor inlet opening 105 is positioned at a bottom 50% of the height of the mixing channel 60 and at a bottom 10% of the height of the mixing channel 60 in another example. In one example, at least about 80% of an open area of the vapor inlet opening 105 is in a bottom 50% of the height of the mixing channel 60 and in about a bottom 10% of the height of the mixing channel 60 in another example.

According to one aspect, a vapor chimney 110 surrounds the vapor inlet opening 105. The vapor chimney 110 includes a chimney wall that extends up from the collection tray and includes an upper chimney inlet or opening 115 to provide for passage of vapor into the chimney 110 and through the vapor inlet opening 105. The vapor chimney opening 115 may be at the top of the chimney 110 or an aperture through the chimney wall. Unless specified, as used herein, upper opening refers to one or more openings that are elevated above a bottom wall or liquid level, for example the liquid collection tray 35 or a bottom wall of a portion of the mixing device 40, and may include, but are not limited to openings in a top or side of a vapor chimney. The opening 115 is preferably positioned at a height above the liquid collection tray 35 above a normal operation liquid level to restrict liquid from entering the chimney 110 and through the vapor inlet 100 with the vapor. In one example, at least about 60% of the fluid entering vapor inlet 100 is vapor. In another example, at least about 80% of the fluid entering vapor inlet 100 is vapor.

The vapor inlet opening 105 may include one or more openings through the outer wall 45 of the mixing channel 60 as illustrated in FIGS. 2, 2B and 3. Alternatively, according to various aspects, the vapor inlet chimney 110 may extend into the mixing channel 60 and the vapor inlet opening 105 may be formed in the chimney wall. In any event, the opening 105 is in fluid communication with the mixing channel 60, and vapor entering the mixing channel 60 from the vapor inlet opening 105 may be introduced into the mixing channel 60 generally across the mixing channel 60 and into and across the liquid stream traveling therethrough. It has been identified injecting or dispersing the vapor toward and across the liquid stream in this manner provides improved intimate contact between the vapor and liquid in the channel and improved mixing of the liquid and vapor as compared to introducing the vapor and liquid streams into a mixing channel together through a common opening with vapor atop of liquid. Further, creating a sufficient pressure drop in the vapor chimney causes the vapor to be dispersed into the mixing channel 60 with sufficient velocity and momentum to travel across the downstream flowing fluid stream to improve mixing. In one example, the pressure drop through the vapor chimney 110 may be between about 0.2 to about 2.5 psi, between about 0.3 and about 2.0 psi in another example, and between about 0.5 and 1.5 in yet another example.

Further, injecting the vapor into a liquid swirling about an annular mixing channel or a liquid with turbulent flow provides additional mixing due to the flow of the vapor and liquid together once the vapor has been introduced. The vapor may be directed through the vapor openings transversely or obliquely to the mixing channel. As mentioned, by one aspect, as illustrated in FIG. 2B, the vapor inlet may include two or more openings 105 positioned at different heights above the liquid collection tray 35. Providing the openings 105 at different heights allows the optimum contact between vapor and liquid.

Figure 7:
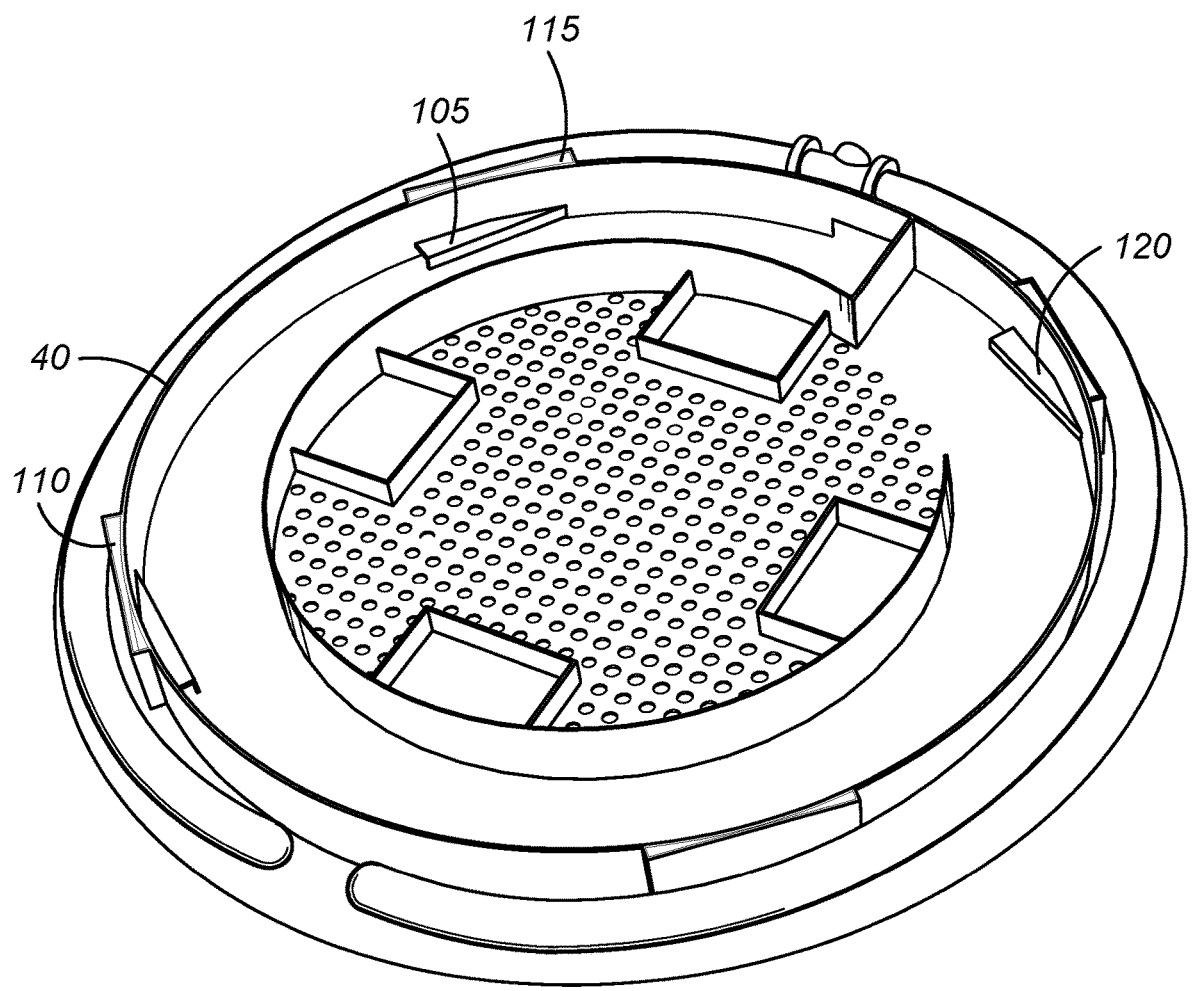

While introducing the vapor orthogonally or near orthogonally to the liquid stream flowing therethrough has been shown to provide good mixing, introducing the vapor in an oblique downstream direction relative to the mixing channel outer wall 45 may provide good mixing while reducing interruption with the flow of fluid in the downstream direction. In this regard, by one aspect, baffles 120 may be provided for directing the vapor entering the mixing channel downstream and obliquely to the liquid stream. The baffles 120 may extend from the opening at an acute angle to the outer wall 45 as illustrated in FIG. 7. In one example the baffles extend generally downstream at an acute angle to the mixing channel outer wall 45. In one example, the acute angle is between about 10 and about 60 degrees, and about 20 and about 45 degrees from outer wall 45 in another example.

In one aspect, one or more additional vapor inlets 125 having vapor inlet openings are positioned downstream of the liquid inlet 75 at different downstream distances than the first vapor inlet 100. It has been identified that providing two or more vapor inlets at different positions along the mixing channel 60 may improve vapor-liquid contacting by gradually directing the vapor into the liquid stream as the liquid stream passes through the mixing channel. The additional vapor inlets 125 may also include vapor chimneys 130 having upper openings. The heights of the upper chimney openings 115 and 135 of the different vapor chimneys may be different such that a chimney having a lower opening height may provide liquid overflow into the vapor chimney and through the vapor inlet in the event of excess liquid accumulation on the liquid collection tray 35 during operation. By providing other chimneys having higher upper chimney opening heights above the tray 35, those chimneys may still restrict excess liquid from entering the chimney with the vapor, allowing primarily vapor to pass through the chimney and into the mixing channel, maintaining vapor-liquid contacting therein. Although various combinations of vapor inlet chimney upper opening heights are possible, preferably an upstream chimney has a lower low opening height than a downstream chimney (downstream along the mixing channel). In this regard, if the liquid level in the liquid collection zone rises, the liquid can overflow into the upstream chimney while vapor still flows through the downstream chimney to contact the liquid that bypassed the liquid opening and entered the mixing channel 60 via the upstream chimney.

As described further below with regard to FIG. 4, by one aspect the mixing channel includes an outer mixing channel 136 and an inner mixing channel 137 positioned inwardly of the outer mixing channel 136. In accordance with this aspect, one or more internal vapor inlets 138 may be provided within the mixing channel to provide vapor to the inner mixing channel 137. The internal vapor inlet 138 includes a chimney vapor opening 139 through a wall of the inner mixing channel 137 or through a chimney 142 of the internal vapor inlet Similar to the vapor inlet 100, the internal vapor inlet opening 139 may be positioned in a lower portion of internal mixing channel 137 so that the vapor entering the mixing channel 137 through the opening 139 is directed toward the liquid stream flowing therethrough. An internal chimney upper opening 143 may extend above the top plate 150 to allow vapor to pass from above the top plate through the chimney 142 and into the inner mixing channel 137. In one approach, the chimney opening may be positioned above an upper surface of the top plate 150 to restrict liquid from entering the chimney 142 along with vapor.

As mentioned, the mixing channel 60 includes inner and outer walls 65 and 45 for defining a fluid passageway. The mixing channel 60 further includes a bottom wall 140 and a top wall 145. The bottom wall 140 may include a portion of the liquid collection tray 35 beneath the mixing channel. The top wall 145 may be provided in the form of top plate or tray 150 covering at least a portion of the mixing channel 60. In one approach, the inner and outer walls 65 and 45 include one or more baffles attached to and extending upwardly from the liquid collection tray 35. Preferably top portions 15 1and 152 of the one or more baffles are at similar heights above the liquid collection tray so that the top plate 150 can be positioned in close proximity or contacting the top portions 151 and 152 to provide a generally enclosed mixing channel 60. The top plate 150 may be supported, at least partially, on the baffles or it may be supported by other structure. In this respect, flanges may be provided at the top portions 151 and 152 to support and/or attached the top plate.

As illustrated in FIGS. 1-3, by one aspect the outer wall 45 includes a baffle 155 extending about a center portion of the reactor 5 and spaced from the reactor walls. The inner wall 65 may be formed by another baffle 160 adjacent to or contacting an inner surface of the outer wall 45 and extending therefrom. It should be noted that each baffle may be formed from a single piece of material or two or more pieces of material joined together. By another aspect, as illustrated in FIG. 4, the outer wall 45 is positioned in close proximity to the reactor wall and a baffle 165 extends in an inward spiraling pattern toward the center portion 153 of the reactor so that the baffle 165 serves as both the inner wall 65 and the outer wall 45 of the mixing channel 60. In yet another example, as illustrated in FIGS. 5-8, the inner wall 65 may be formed from a baffle 170 separate from and spaced inwardly from a baffle 175 forming the outer wall 45. In this approach, a separator baffle 180 may separate the inlet end portion 80 from an outlet end portion 90 of the mixing channel 60. The separator baffle 180 may also serve as a contact surface to disrupt the swirling flow of fluid through the mixing channel 60 before the fluid exits the mixing channel 60 and enters a distribution zone 190 of the mixing device 40 to facilitate separation and distribution of the vapor and liquid therefrom.

As mentioned previously, by one aspect, the mixing channel 60 can include an inwardly spiraling channel having an outer channel portion 136 and an inner channel portion 137 positioned inwardly therefrom as illustrated in FIG. 4.

An intermediate wall 191 may be positioned between the outer wall 45 and the inner wall 65 and may be formed of the same or a different baffle from the one or more baffles forming the outer wall and the inner wall. Alternatively, the outer wall 45 can be positioned in close proximity to the reactor wall as illustrated in FIG. 4 with only a single mixing channel 60 to provide a wider mixing channel By one aspect, the mixing system 30 further includes a distribution zone 190 for distributing the fluid from the mixing device to a final vapor and liquid distribution tray 210. The distribution zone 190 may include an inlet portion 195 in fluid communication with the outlet end portion 90 of the mixing channel 60. The distribution zone 190 may be generally coplanar with the mixing channel 40 to reduce an overall height of the mixing device 40 and the necessary interbed space required between the superior and inferior catalyst beds 10 and 15. As is typical, a final distribution tray 210 may be included below the mixing device, including the distribution zone 190, for providing high quality fluid distribution across the inferior catalyst bed 15.

By one aspect, the distribution zone 190 includes one or more liquid distributors 200 and one or more vapor distributors 205. In one approach the liquid distributors 200 include openings 201 through a bottom portion of the distribution zone 190, for example a distribution zone bottom wall 215. The vapor distributors 205 may include one or more openings or vapor distribution chimneys 220. The vapor distribution chimney 220 includes an outer wall to restrict liquid flow through the chimney 220 and an upper opening to allow passage of vapor into and downward through the chimney. The vapor distribution chimney 220 includes a bottom opening 225 through the distribution zone bottom wall 215 to allow vapor to pass downwardly therethrough. The distribution zone bottom wall 215 may be formed by a portion of the liquid collection tray 35 extending below the distribution zone 190. By one aspect, the mixing device 40 includes an annular mixing channel 60 and the distribution zone 190 is positioned inwardly of the mixing channel toward a center portion of the mixing device 40 with an inlet portion 195 of the distribution zone 190 in fluid communication with the mixing channel outlet portion 90.

By one aspect, the distribution zone 190 includes a liquid separation and distribution zone 230 as illustrated in FIGS. 2-4. The zone 230 may be provided for separating liquid and vapor and distributing the liquid therebelow. The zone 230 includes a channel 235 between an outer wall 240 and an inner wall 245. The channel 235 may have an arcuate or annular configuration, or other suitable shape such as, for example, polygonal, and be positioned within the annular mixing channel 60. In this regard, the mixing channel inner wall 65 may form all or a portion of the channel outer wall 240 such that they are provided via a common baffle extending upwardly from the bottom wall and/or liquid collection tray 35. A center vapor distribution chimney 255 may have a chimney wall that forms the inner wall 245 of the channel Without intending to be bound by theory, it is believed that as the fluid passes from the outlet of the mixing channel 60 through the channel 235, the centrifugal forces acting on the fluid as it swirls around the liquid separation channel 235 causes the heavier liquid to separate from the vapor. The liquid distributors 200 may be provided in the bottom wall 250 of the liquid separation channel for so that the liquid is collected on the bottom wall 250 and distributed therebelow through the distributors 200.

As illustrated in FIGS. 1-3, by one aspect, a center vapor distribution chimney 255 may be positioned inwardly of the liquid separation channel 235, and as mentioned above, form an inner wall of the liquid separation channel 235. The vapor distribution chimney 255 may have a chimney wall 260 extending above the bottom wall of the distribution zone bottom wall 280. The distribution chimney includes an upper opening 265. The vapor chimney allows vapor to pass through the upper opening while restricting the flow of liquid therethrough. By one aspect, the vapor distribution chimney wall 260 extends upwardly only part-way to an upper wall of the distribution zone, which may be a portion of the top plate or a separate wall. In this regard, the upper opening is provided between an upper portion of the distribution chimney wall 260 and the top plate 150. As shown in FIG. 1, a spacer 270 may be provided above the chimney wall 260 between the upper portion thereof and the top plate 150 to support the top plate 150 thereabove. The spacer 270 may include one or more bars or other obstructions extending across the vapor chimney. In one example, a generally X-shaped support 275 is positioned between vapor distribution chimney 255 and the top plate 150 to support the top plate 150. The support may advantageously arrest the swirling flow of vapor in the distribution zone 190.

Figure 5:
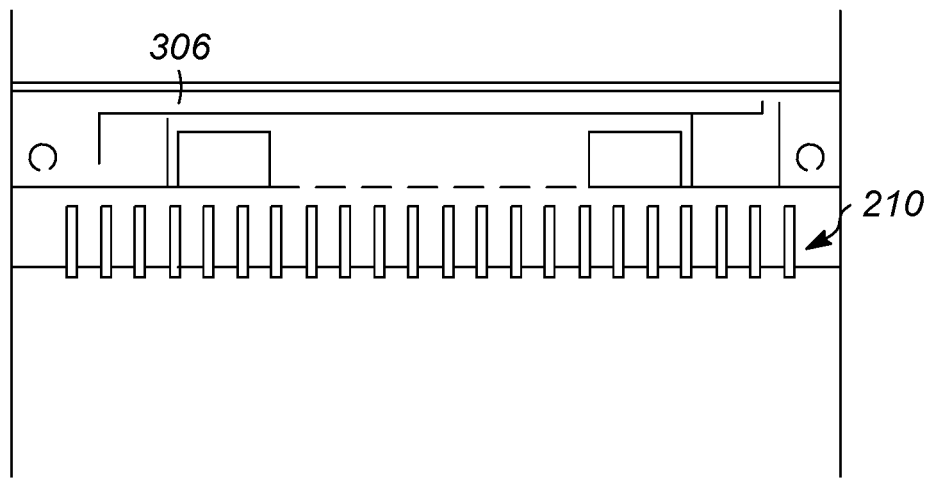
Figure 6:
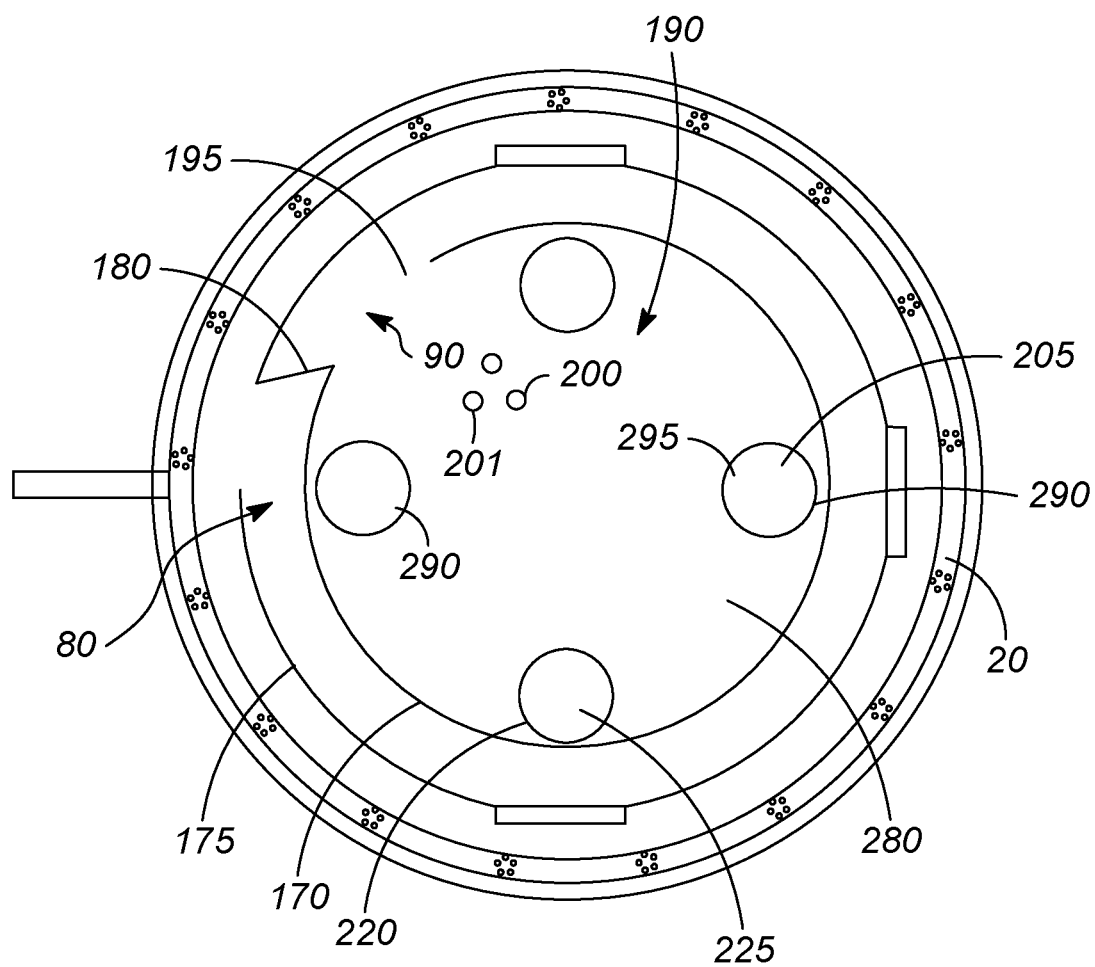

According to another aspect, as illustrated in FIGS. 5-6, the distribution zone 190 may include a bottom wall having a plurality of liquid outlets 200 therein. The outlets 200 according to this aspect may include a plurality of openings 201 through the bottom wall 280. The openings 201 for liquid flow are preferentially positioned at locations such that the liquid flows from these opening will not fall on to top of the distributors on the vapor-liquid distribution tray below. The bottom wall 280 may include a portion of the liquid collection tray 35. One or more vapor distribution chimneys 220 may extend upward from bottom wall 280. Each vapor distribution chimney 220 includes a vapor chimney wall 290 and an upper vapor chimney opening 295 to restrict liquid from entering the vapor distribution chimney 220. The vapor distribution chimney 220 encloses an opening 225 through the bottom wall 280 to vapor passes through the opening and is distributed therebelow.

Figure 8:
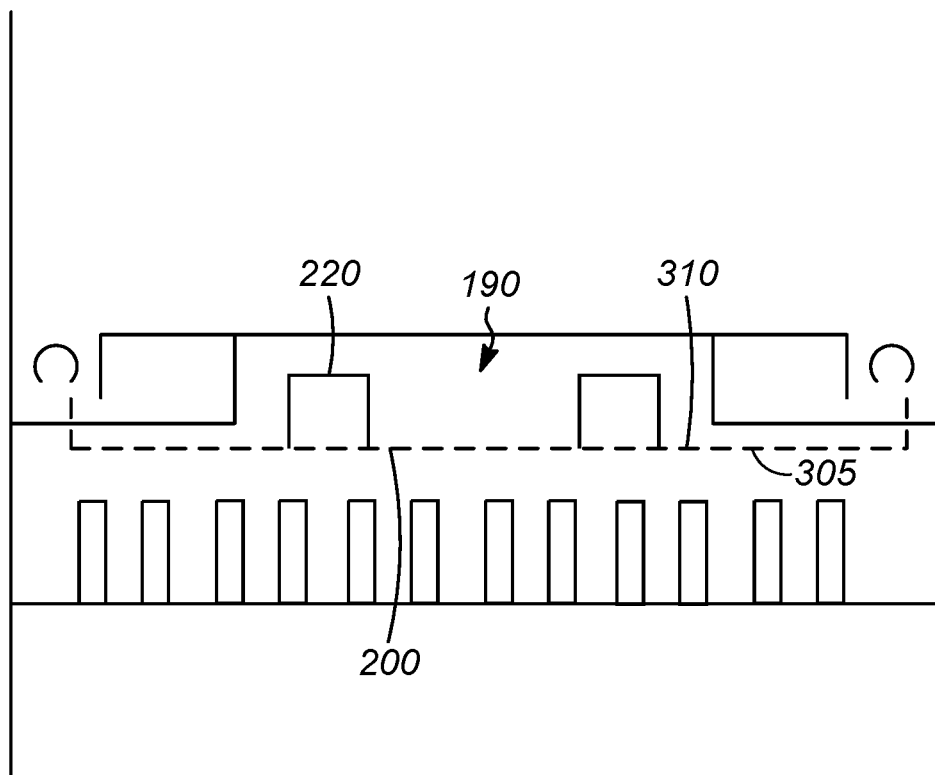

By one aspect, the liquid distributor bottom wall 280 forms a part of, or is at least generally co-planar with, the liquid collection tray 35. By another aspect, the bottom wall 280 may include a bottom tray 305 offset below the liquid collection tray 35 as illustrated in FIG. 8. The bottom tray may extend beyond the distribution zone 190 and below at least a portion of the mixing channel 60. In this manner, the bottom tray 305 has a larger cross sectional area than is possible where the bottom wall 280 is co-planar with the liquid collection tray 35 to provide for improved distribution therefrom. The expanded rough liquid distribution zone will reduce liquid height gradient and liquid momentum flux on vapor-liquid distribution tray below. In this approach, the distribution zone may include at least one opening 310 therethrough for passing fluid to the bottom tray 305. By one aspect, the one or more vapor distribution chimneys 220 may extend up from the bottom tray 305, through the opening 310, and into the distribution zone 190. In this regard, the bottom tray 305 may be spaced closely to the liquid collection tray 35 while still providing for sufficient vapor distribution chimney wall height. In one example, the bottom tray is spaced between about 1 and about 5 in., in another example between about 2 and about 4 in., and in yet another example between about 1.5 and about 3 in. from the liquid collection tray 35. The distribution zone can also be expanded into the bottom of mixing channel by raising the bottom of the mixing channel above the collection tray so that the distribution zone is co-planar with the liquid collection tray.

As described previously, the mixing device 40 may include a top plate 150 for providing a cover for the mixing channel 60 and/or distribution zone 190. The top plate 150 may be positioned near the bottom portion of the superior catalyst bed 10. It should be noted, that as used herein, the terms superior catalyst bed 10 and inferior catalyst bed 15, refer respectively to a catalyst bed system above the mixing stage and a catalyst bed system below the mixing stage, including supports and any other parts of the catalyst bed system as are generally understood in the art. The top plate 150 is preferably spaced from the bottom portion of the superior catalyst bed 10 so that it does not restrict the flow of fluid descending therefrom. In this regard, descending fluid may contact and/or accumulate on an upper surface 306 of the top plate 150.

The top plate 150 may be configured to direct fluid in a desired manner. For example, the top plate may include weirs, an inclined surface, or other suitable features to direct fluid into a liquid collection zone 50 or a liquid collection well 55. For example, referring momentarily to FIG. 4, an opening or space may be provided in the top plate 150 above the well 55 to allow fluid to pass therethrough.

According to one aspect, the system for providing a quench gas and mixing vapor and liquid between the superior 10 and inferior 15 catalyst beds includes a quench gas distributor 20 as illustrated in FIG. 2. The quench gas distributor 20 may be positioned within the reactor walls and configured to dispense a quench gas toward fluid descending from the superior catalyst bed 10 to cool the fluid. The quench gas distributor may include a quench gas line 320 in communication with a quench gas source (not shown). The distributor may include a line, tube or pipe 325 extending about at least a portion of the interior of the reactor 5.

As illustrated in FIG. 2, the quench gas distributor includes an arcuate pipe extending along the inner surface of the reactor wall between the reactor wall 6 and the mixing device 40. The pipe 325 includes a plurality of quench gas outlets or nozzles 330 for dispensing the quench gas. The nozzles 330 may include any suitable outlet. By one aspect, the nozzles are positioned above an operation liquid level of the liquid collection tray 35 so that liquid does not enter the nozzles. It has been identified that hydrocarbon liquid entering the nozzles may harden upon shutdown of the system when the hydrocarbon liquid cools and block the nozzles for future use. In one approach, the nozzles 330 are positioned near a bottom portion of a superior catalyst bed 10. The nozzles 330 may be configured to direct quench gas generally horizontally across the reactor to contact fluid descending from the upper catalyst bed 10, although the nozzles may also direct the quench gas in other directions. In one approach, the nozzles are configured to direct fluid between the upper surface of the top plate 150 and the catalyst bed. In this manner, intimate contact may be made between the quench gas and the descending fluids.

Figure 9:
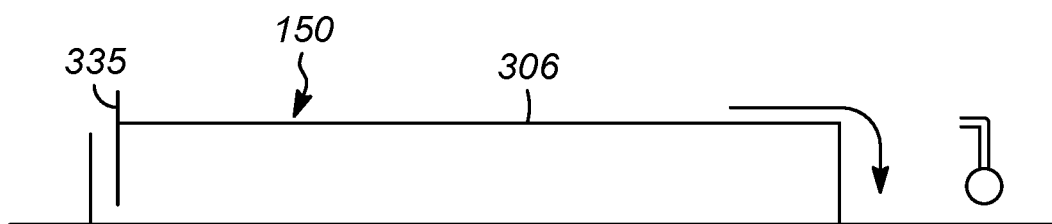
Figure 10:
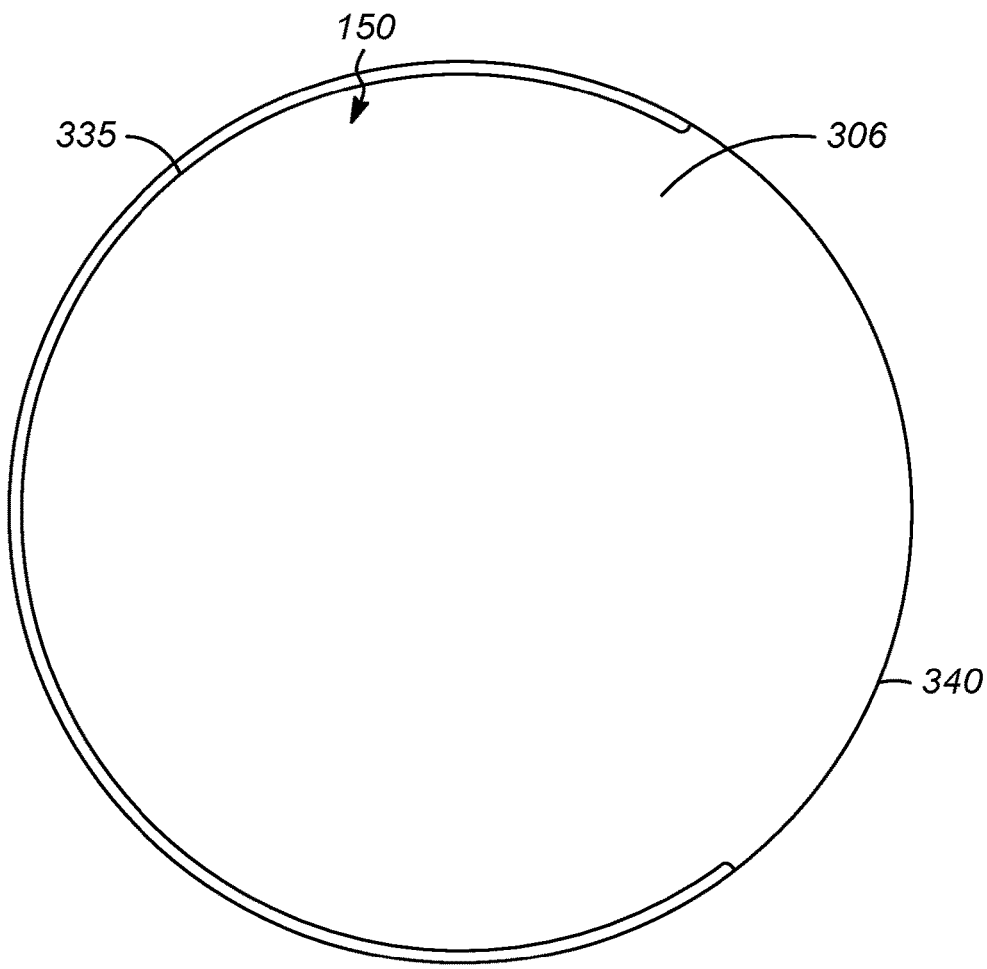
Figure 11:
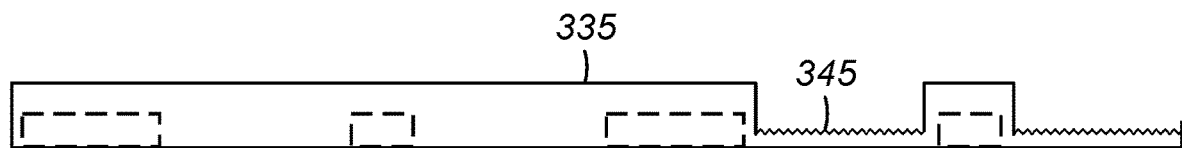

In another example, as illustrated in FIGS. 8-10, the quench gas distributor 20 may be positioned to direct quench gas toward fluids flowing from the top plate 150. For example, the quench gas distributor may be positioned to direct quench gas toward a mixing channel outer wall 45 to contact fluids cascading down from the top plate 150. In one approach, as illustrated in FIGS. 9 and 10, a weir 335 may be provided about at least a portion of the top plate 150. The weir 335 may include an opening 340 so that fluids are directed through the opening 340. The nozzles 330 may be configured to direct the quench gas toward the opening 340 to increase the amount of contact between the quench gas and the fluids. The opening may include one or more apertures in the weir, a gap in the weir, a low portion of the weir, or any other type of opening that facilitates the flow of fluids therethrough. By one approach, the opening may include a low portion 345 of the weir 335 having an irregular upper portion, such as the zigzag pattern illustrated in FIG. 11.

The quench gas distributor 20 may be positioned within the liquid collection zone 50, as illustrated in FIGS. 5 and 6, or only extend about a portion of the reactor as illustrated in FIGS. 2 and 8.

In another example, illustrated in FIGS. 5 and 6, the quench gas distributor may be configured to direct quench gas downward toward liquid in the liquid collection tray 35. Also, as illustrated in FIGS. 5 and 6, the quench gas distributor 20 may be partially or completely submerged in liquid on the liquid collection tray 35 to improve contacting between the quench gas and the liquid on the liquid collection tray 35. However, as discussed above, care should be taken so that hydrocarbon fluid does not harden within the quench gas distributor nozzles 330 when it is cooled.

By one aspect, a final distribution tray 210 may be positioned below the mixing device 40 for final distribution of the liquid to the inferior catalyst bed 15. Suitable final distribution trays are commercially available, and one such tray is described in U.S. Pat. No. 7,506,861, which is incorporated herein, by reference in its entirety.

While this description has been provided with regard to specific embodiments, it is to be understood that this description should not be limiting to the disclosed embodiments, but it is intended to cover various modifications and equivalent arrangements included within the scope of the appended claims.

The invention claimed is:

1. A device for fluid contacting in a downflow vessel, comprising:
    a liquid collection tray;
    a generally annular mixing channel having an inlet in communication with the liquid collection tray for contacting vapor and liquid;
    a generally annular liquid separation channel having an inlet in fluid communication with an outlet of the mixing channel and positioned inwardly thereof for separating at least a portion of liquid and vapor flowing therethrough;
    a vapor chimney positioned inwardly of the liquid separation channel having a chimney wall extending above a bottom wall of the liquid separation channel to restrict flow of liquid through the chimney; and
    a chimney opening in communication with the annular liquid separation channel for passing vapor therethrough.

2. The device of claim 1, wherein the liquid separation channel further includes an outer wall, an inner wall, and a top wall; and
    an opening through the liquid separation channel bottom wall for distributing liquid therethrough.

3. The device of claim 1, wherein the liquid separation channel includes an outer wall and a liquid separation channel passageway is defined between the outer wall and the chimney wall.

4. The device of claim 1, further comprising a top plate covering at least a portion of the annular liquid separation channel and the vapor chimney,
    a first baffle extending upwardly from the liquid collection tray forming an outer wall of the liquid separation channel; and
    a second baffle extending upwardly from the liquid collection tray defining an inner wall of the liquid separation channel and the vapor chimney, wherein the second baffle has a height that is less than a height of the first baffle to define the upper opening between the second baffle and the top plate.

5. The device of claim 4, further comprising a vortex breaker between the second baffle and the top plate for interrupting a fluid vortex.

6. The device of claim 1, wherein the mixing channel includes an outer wall and an inner wall and at least a portion of the mixing channel inner wall forms at least a portion of an outer wall of the liquid separation channel.

7. The device of claim 1, wherein the liquid separation channel, the vapor chimney, and the mixing channel are positioned above the liquid collection tray and are generally co-planar with each other to reduce an overall height of the device.

8. The device of claim 1, wherein one or more baffles extend upwardly from the liquid collection tray in a generally continuous inwardly spiraling pattern to form outer walls of at least a portion of the mixing channel and at least a portion of the liquid separation channel and at least an inner wall of at least a portion of the mixing channel.

9. The device of claim 1, wherein the mixing channel liquid inlet includes an opening in a bottom portion of an outer wall of the mixing channel to reduce an amount of vapor that enters through the liquid inlet.

10. The device of claim 9, further comprising a vapor inlet of the mixing channel positioned downstream of the liquid inlet and including an opening at a bottom portion of the mixing channel to direct vapor into fluid flowing through the mixing channel.

11. The device of claim 10, further comprising a vapor inlet chimney enclosing the vapor inlet and having an upper chimney opening to minimize an amount of liquid that enters the vapor inlet.

12. The device of claim 1, further comprising a rough distribution tray offset below the liquid collection tray and extending below the vapor chimney and at least a portion of the liquid collection tray.

13. The device of claim 12, further comprising at least one other vapor chimney extending upwardly from the rough distribution tray and into the vapor chimney.

14. A device for vapor-liquid contacting in a co-current flow reactor, comprising:
    a liquid collection tray;
    an annular mixing channel having an inlet in communication with the liquid collection tray for contacting vapor and liquid;
    a liquid distribution zone positioned inwardly of the annular mixing channel having an inlet in fluid communication with the annular mixing channel;
    a bottom wall of the liquid distribution zone having openings therethrough for distributing liquid therebelow;
    one or more vapor chimneys supported by the bottom wall and having an upper opening; and
    a chimney opening through the bottom wall and enclosed by the vapor chimney for distributing vapor therebelow.

15. The device of claim 14, wherein the bottom wall of the liquid distribution zone comprises a portion of the liquid collection tray and the liquid distribution zone is generally co-planar with the mixing channel to minimize the overall height of the device.

16. The device of claim 14, wherein the liquid distribution zone includes a central opening extending through the liquid collection tray for passage of fluid and the bottom wall includes a perforated tray offset below the liquid collection tray and extending below the central opening and at least a portion of the liquid collection tray.

17. The device of claim 16, wherein the at least one chimney includes an upper portion extending through the central opening to minimize the overall height of the device.

18. The device of claim 14, further comprising an outlet of the mixing channel in communication with the distribution zone, and an end wall of the outlet portion forming a contact surface to provide further contacting of the liquid and vapor prior to entering the distribution zone.

19. The device of claim 14, wherein the mixing channel inlet includes a liquid inlet opening in a bottom portion of an outer wall of the mixing channel to reduce an amount of vapor that enters through the liquid inlet.

20. The device of claim 19, wherein the mixing channel inlet further includes a vapor inlet positioned downstream of the liquid inlet, including an opening in a bottom portion of the mixing channel to direct vapor into fluid flowing through the mixing channel and a vapor inlet chimney enclosing the vapor inlet and having an upper chimney opening to minimize an amount of liquid that enters the vapor inlet.

\* \* \* \* \*